ETHER-ESTERS OF SUCROSE

Arthur W. Anderson, Midland, Mich., assignor to The Dow Chemical Company, Midland, Mich., a corporation of Delaware No Drawing. Application December 30, 1957
Serial No. 705,736

12 Claims. (Cl. 260—209)

The present invention relates to ether-esters of carboxylic acids and is more particularly concerned with new and useful compounds having the general formula

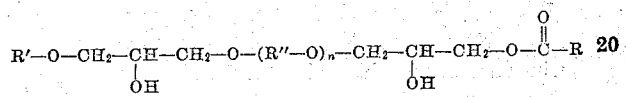

wherein R represents a hydrocarbon radical having from 1 to 19 carbon atoms, inclusive, which may contain halogen substituents thereon, R′ represents a hydroxyalkylsucrose residue (having an average of from 8 to 10 oxyalkylene groups per mole of sucrose), R″ represents an alkylene radical having from 2 to 4 carbon atoms, inclusive, and $n$ represents an integer from 2 to 20, inclusive. The new compounds are useful as the self-solubilizing active ingredient of plant growth control compositions and in bacterial and fungicidal compositions in either aqueous or oil systems.

The compounds of the present invention can be prepared by reacting a diglycidyl ether of a polyoxyalkylene glycol with an equimolar amount of a hydroxyalkylsucrose and an equimolar amount of an appropriate acid in the presence of a suitable catalyst. The reaction proceeds smoothly at temperatures from room temperature to about 120° C. with the production of the desired product in substantially quantitative yields. The desired product may be employed as thus obtained or purified by conventional manner.

In making the compounds of the present invention, a diglycidyl ether of a polyglycol, an equimolar portion of hydroxyalkylsucrose and an equimolar portion of an organic acid are mixed or otherwise blended together in the presence of a catalyst such as an aliphatic amine, for example, hexamethylenetetramine, and at a temperature of from room temperature to about 120° C. The reaction is preferably carried out at about 60° to 100° C. for a period of time to complete the reaction. Upon completion of the reaction, the desired product, usually produced in quantitative yields, may be purified by solvent extraction if desired.

The following examples are illustrative of the present invention but are not to be construed as limiting.

Example 1

4.4 grams of 2,4,5-trichlorophenoxyacetic acid, 9.6 grams (1.0 molar equivalent) of diglycidyl ether of polyoxyethylene glycol (polyglycol having average molecular weight 400), 12.2 grams (1 molar equivalent) of hydroxyethylsucrose ether (condensation product of 10 moles ethylene oxide per mole of sucrose) and 0.25 gram of hexamethylenetetramine were mixed together and heated in a steam bath at 85° C. for 6 hours. The product, an amber colored, syrupy liquid was analyzed and found to contain 0.4 percent free acid, and 4.4 percent unreacted diglycidyl ether of the polyglycol. It was soluble in water and was found to be effective as a herbicide exhibiting 98 and 99 percent control of Brassica rapus and Phalaris canarensis, respectively, when applied to the living vegetation as an aqueous self-emulsifying solution at a concentration of 100 parts per million of active ingredient.

In the manner of the foregoing example substituting the various ethers, acids and hydroxyalkylsucroses other compounds of the present invention can be prepared. The results of such substitution and the properties of some of the products produced are set forth below:

| Reactants (1 mol each) | | | Water Solubility | Remarks |
|---|---|---|---|---|
| Acid Employed | Sucrose Ether | Diglycidyl Ether of Polyglycol Having a Molecular Weight of | | |
| Stearic | Hydroxyethyl (10 E.O./mol) | Polyethylene 400 | Soluble | Surface active. |
| 2,4,5-trichlorophenoxyacetic | Hydroxypropyl (8 P.O./mol) | Polypropylene 400 | Self dispersible | Surface active herbicidal. |
| Do | do | do | do | Do. |
| Acetylsalicylic | do | do | Soluble | Surface active fungicidal. |
| Do | Hydroxyethyl (10 E.O./mol) | do | Self dispersible | Slightly fungicidal. |
| Bromoacetic | do | do | Soluble | Slightly herbicidal. |
| 2,4-dichlorophenoxyacetic | do | do | do | Herbicidal antimicrobial. |
| 3,4-dichlorophenoxyacetic | do | do | do | Herbicidal. |
| 2(2,4,6-trichlorophenoxy)propionic | do | do | do | Herbicidal antimicrobial. |
| 4(2,4-dichlorophenoxy)butyric | do | do | do | Slightly active. |
| 4-chloro-o-toloxyacetic | do | do | do | Herbicidal antimicrobial. |
| 2,2-dichloropropionic | do | do | do | Herbicidal. |

It is to be understood that any aliphatic or aromatic monocarboxylic acid can be employed in accordance with the present invention. Thus, for example, acetic, propionic, butyric, isobutyric, valeric, isovaleric, pivalic, caproic, isocaproic, α,β-dimethylbutyric, enanthic, isoenanthic, caprylic, pelargonic, capric, hendecanoic, lauric, tridecanoic, myristic, pentadecanoic, palmitic, margaric, stearic, nonadecanoic, arachidic, acrylic, crotonic, methylacrylic, tiglic, angelic, senecioic, oleic, linoleic, sorbic, benzoic, toluic, hydrocinnamic, xylic, phenoxyacetic, acetylsalicylic, phenoxypropionic, phenoxybutyric acids and the like, and their halo and alkylsubstituted derivatives such as 2,4-dichlorophenoxyacetic, 2,4,5 - trichlorophenoxyacetic acid, 2,(2,4,6 - trichlorophenoxy)propionic acid.

Further, any polyoxyalkylene glycols wherein the polyoxyalkylene chain is a series of oxyethylene, -propylene or -butylene moieties may be employed.

The polyoxyalkylene glycol diglycidyl ethers used in making the compounds of the present invention may be conveniently prepared by the condensation of the polyglycol with glycidol or, preferably, with epichlorohydrin in the presence of alkali in the manner commonly used in making glycidyl ethers.

The hydroxyalkylsucrose ethers employed in accordance with the present invention are the hydroxyethyl, hydroxypropyl and the hydroxybutylsucrose ethers obtainable by the reaction of from 8 to 10 moles of alkylene oxide with sucrose to etherify at least each hydroxyl of the sucrose and to produce in some instances polyoxyalkylene chains. It is to be understood that mixtures of the oxides may be employed in making the sucrose ethers.

I claim:

1. An ether-ester of a carboxylic acid which has the formula

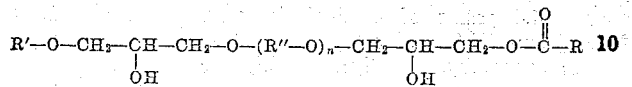

wherein R represents an organic radical containing from 1 to 19 carbon atoms inclusive and selected from the class consisting of monovalent aliphatic radicals and monovalent aromatic radicals of the benzene series, R' represents a hydroxyalkylsucrose residue containing from 8 to 10 oxyalkylene groups each of said oxyalkylene having from 2–4 carbon atoms inclusive, R" represents an alkylene radical having from 2 to 4 carbon atoms, inclusive, and $n$ represents an integer from 2 to 20, inclusive.

2. An ether-ester of a carboxylic acid as set forth in claim 1 wherein R is an aliphatic radical.

3. An ether-ester of a carboxylic acid as claimed in claim 1 wherein R is a phenoxyaliphatic radical.

4. An ether-ester of a carboxylic acid as claimed in claim 1 wherein R is a haloaliphatic radical.

5. An ether-ester of a carboxylic acid as claimed in claim 1 where R represents an alkyl radical.

6. An ether-ester of a carboxylic acid as claimed in claim 1 wherein R represents an alkenyl radical.

7. An ester-ether of a carboxylic acid as claimed in claim 1 wherein R is a 2,4,5-trichlorophenoxyalkyl radical.

8. An ester-ether of a carboxylic acid as claimed in claim 1 wherein R is a 2,4-dichlorophenoxyalkyl radical.

9. An ester-ether of a carboxylic acid as claimed in claim 1 wherein R is a bromomethyl radical.

10. An ester-ether of a carboxylic acid as claimed in claim 1 wherein R' is ethylene and $n$ represents about 10.

11. An ester-ether of a carboxylic acid as claimed in claim 1 where R' is propylene and $n$ is about 8.

12. A method for the preparation of a compound having the formula

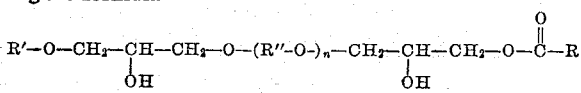

wherein R represents an organic radical containing from 1 to 19 carbon atoms inclusive and selected from the class consisting of monovalent aliphatic radicals and monovalent aromatic radicals of the benzene series, R' represents a hydroxyalkylsucrose residue containing about 8 to 10 oxyalkylene groups each of said oxyalkylene having from 2–4 carbon atoms inclusive, R" represents an alkylene radical having from 2 to 4 carbon atoms, inclusive, and $n$ represents an integer from 2 to 20 inclusive, which comprises reacting equimolar proportions of a diglycidyl ether of a polyglycol having the formula

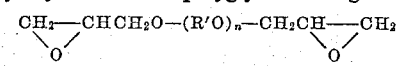

with an organic acid having the formula

and a hydroxyalkylsucrose having from 8 to 10 oxyalkylene groups per sucrose molecule in the presence of a catalyst and at a temperature of from 60° C. to 100° C.

References Cited in the file of this patent

UNITED STATES PATENTS

| | | |
|---|---|---|
| 2,450,079 | Brown | Sept. 28, 1948 |
| 2,541,142 | Zief et al. | Feb. 13, 1951 |
| 2,602,789 | Schwartz et al. | July 8, 1952 |

FOREIGN PATENTS

| | | |
|---|---|---|
| 495,548 | Canada | Aug. 25, 1953 |